United States Patent
Li et al.

(10) Patent No.: US 12,482,089 B2
(45) Date of Patent: Nov. 25, 2025

(54) GRADING COSMETIC APPEARANCE OF AN ELECTRONIC DEVICE

(71) Applicant: Future Dial, Inc., Sunnyvale, CA (US)

(72) Inventors: Jisheng Li, Los Altos, CA (US); Qing Zhang, Cupertino, CA (US)

(73) Assignee: Future Dial, Inc., Sunnyvale, CA (US)

( * ) Notice: Subject to any disclaimer, the term of this patent is extended or adjusted under 35 U.S.C. 154(b) by 360 days.

(21) Appl. No.: 17/525,643

(22) Filed: Nov. 12, 2021

(65) Prior Publication Data
US 2023/0153986 A1    May 18, 2023

(51) Int. Cl.
| | |
|---|---|
| G06T 7/00 | (2017.01) |
| G01B 11/24 | (2006.01) |
| G01N 21/88 | (2006.01) |
| G06K 7/14 | (2006.01) |
| G06T 7/194 | (2017.01) |

(52) U.S. Cl.
CPC .............. *G06T 7/001* (2013.01); *G01B 11/24* (2013.01); *G01N 21/8851* (2013.01); *G06K 7/1413* (2013.01); *G06K 7/1443* (2013.01); *G06T 7/194* (2017.01); *G01N 2021/8854* (2013.01)

(58) Field of Classification Search
CPC ...................... G06T 7/001; G06T 7/194; G06T 2207/30164; G01B 11/24; G01N 21/8851; G01N 2021/8854; G06K 7/1413; G06K 7/1443
See application file for complete search history.

(56) References Cited

U.S. PATENT DOCUMENTS

| | | | |
|---|---|---|---|
| 11,243,513 B2 * | 2/2022 | Principato | G05B 19/4189 |
| 11,526,932 B2 * | 12/2022 | Bowles | G06K 7/10861 |
| 2002/0186877 A1 * | 12/2002 | Vilella | G06T 7/0004 |
| | | | 382/145 |
| 2015/0022657 A1 * | 1/2015 | Lee | G01N 21/8806 |
| | | | 348/129 |
| 2017/0004617 A1 * | 1/2017 | Lee | G01N 21/8806 |
| 2019/0066199 A1 * | 2/2019 | Wishne | G06Q 30/0643 |
| 2019/0258225 A1 * | 8/2019 | Link | G05B 19/4097 |
| 2020/0265487 A1 * | 8/2020 | Silva | G06T 7/0004 |
| 2020/0311895 A1 * | 10/2020 | Sakurai | G06T 5/50 |
| 2020/0357106 A1 * | 11/2020 | Lin | G06V 10/764 |
| 2021/0116392 A1 * | 4/2021 | Fitzgerald | G06K 7/1417 |
| 2022/0051507 A1 * | 2/2022 | Forutanpour | G07F 9/002 |
| 2022/0092756 A1 * | 3/2022 | Huang | G06V 10/82 |
| 2022/0114854 A1 * | 4/2022 | Forutanpour | G06Q 20/18 |
| 2022/0289403 A1 * | 9/2022 | Afrasiabi | B64F 5/10 |

* cited by examiner

*Primary Examiner* — Michael P LaPage
(74) *Attorney, Agent, or Firm* — Greenberg Traurig

(57) ABSTRACT

A method includes receiving, by a processor, a plurality of images of a test object, the plurality of images including a plurality of surfaces of the test object. The processor receives an image of a barcode on the test object. The processor selects a region of interest in each of the plurality of images of the test object. The region of interest includes the test object having a background removed. For the plurality of regions of interest as selected, the processor compares each region of interest with a corresponding profile image and identifying defects in each region of interest. The corresponding profile image is determined from the image barcode on the test object. The method includes grading, by the processor, a cosmetic appearance of each region of interest based on the identified defects. The method includes storing the grades of the cosmetic appearance for each region of interest.

13 Claims, 7 Drawing Sheets

GRADING COSMETIC APPEARANCE OF AN ELECTRONIC DEVICE

FIELD OF THE TECHNOLOGY

At least some embodiments disclosed herein relate generally to cosmetic evaluation of an object. More particularly, the embodiments relate to systems, devices, and methods for computer-aided cosmetic evaluation and categorization of an object such as, but not limited to, an electronic device or the like.

BACKGROUND

Large volumes of computing devices (e.g., mobile devices, such as cellular telephones, tablets, etc.) are recycled and often refurbished. There are numerous aspects to the refurbishing process. One aspect includes inspecting the visual characteristics of the computing device to grade its visual appearance. Some of these devices are then refurbished and can be resold to new users.

SUMMARY

In some embodiments, a method includes receiving, by a processor, a plurality of images of a test object, the plurality of images including a plurality of surfaces of the test object. In some embodiments, the method includes receiving, by the processor, an image of a barcode on the test object. In some embodiments, the method includes selecting, by the processor, a region of interest in each of the plurality of images of the test object. In some embodiments, the region of interest includes the test object having a background removed. In some embodiments, for the plurality of regions of interest as selected, the method includes comparing, by the processor, each region of interest with a corresponding profile image and identifying defects in each region of interest. In some embodiments, the corresponding profile image is determined from the image barcode on the test object. In some embodiments, the method includes grading, by the processor, a cosmetic appearance of each region of interest based on the identified defects. In some embodiments, the method includes storing the grades of the cosmetic appearance for each region of interest.

In some embodiments, the method includes sending the grades of the cosmetic appearance for each region of interest to a remote device.

In some embodiments, the plurality of images of the test object are received from a remote device. In some embodiments, the remote device includes a camera configured to capture the plurality of images.

In some embodiments, the remote device is a cosmetic inspection device.

In some embodiments, the remote device is a mobile device.

In some embodiments, the barcode is a QR code.

In some embodiments, the method includes aligning the plurality of images with the corresponding profile images.

In some embodiments, the test object is a mobile device. In some embodiments, the method includes determining a value of the mobile device based on the grades of the cosmetic appearance for each region of interest.

In some embodiments, the test object is a mobile device. In some embodiments, the barcode is a QR code displayed on a display of the mobile device.

In some embodiments, a system includes a server device including a processor and a memory. In some embodiments, the processor of the server device is configured to receive a plurality of images of a test object. In some embodiments, the plurality of images include a plurality of surfaces of the test object. In some embodiments, the processor is configured to receive an image of a barcode on the test object. In some embodiments, the processor is configured to select a region of interest in each of the plurality of images of the test object. In some embodiments, the region of interest includes the test object having a background removed. In some embodiments, for the plurality of regions of interest as selected, the processor is configured to compare each region of interest with a corresponding profile image and identify defects in each region of interest. In some embodiments, the corresponding profile image is determined from the image barcode on the test object. In some embodiments, the processor is configured to grade a cosmetic appearance of each region of interest based on the identified defects. In some embodiments, the processor to store the grades of the cosmetic appearance for each region of interest.

In some embodiments, the processor is configured to send the grades of the cosmetic appearance for each region of interest to a remote device over a network.

In some embodiments, the plurality of images of the test object are received from a remote device over a network. In some embodiments, the remote device includes a camera configured to capture the plurality of images.

In some embodiments, the remote device is a cosmetic inspection device.

In some embodiments, the remote device is a mobile device.

In some embodiments, the barcode is a QR code.

In some embodiments, the processor is configured to align the plurality of images with the corresponding profile images.

In some embodiments, the test object is a mobile device. In some embodiments, the processor is configured to determine a value of the mobile device based on the grades of the cosmetic appearance for each region of interest.

In some embodiments, the test object is a mobile device. In some embodiments, the barcode is a QR code displayed on a display of the mobile device.

In some embodiments, a non-transitory computer-readable storage medium includes instructions that, when executed by a processor, cause the processor to perform a method. In some embodiments, the method includes receiving, by the processor, a plurality of images of a test object, the plurality of images including a plurality of surfaces of the test object. In some embodiments, the method includes receiving, by the processor, an image of a barcode on the test object. In some embodiments, the method includes selecting, by the processor, a region of interest in each of the plurality of images of the test object. In some embodiments, the region of interest includes the test object having a background removed. In some embodiments, for the plurality of regions of interest as selected, the method includes comparing, by the processor, each region of interest with a corresponding profile image and identifying defects in each region of interest. In some embodiments, the corresponding profile image is determined from the image barcode on the test object. In some embodiments, the method includes grading, by the processor, a cosmetic appearance of each region of interest based on the identified defects. In some embodiments, the method includes storing the grades of the cosmetic appearance for each region of interest.

In some embodiments, the method includes sending the grades of the cosmetic appearance for each region of interest to a remote device over a network.

BRIEF DESCRIPTION OF THE DRAWINGS

References are made to the accompanying drawings that form a part of this disclosure and illustrate embodiments in which the systems and methods described in this Specification can be practiced.

Like reference numbers represent the same or similar parts throughout.

DETAILED DESCRIPTION

Various objects such as, for example, a shipping box or container can show damage such as scuffmarks, dents, rips, tears, or the like. Other examples include computer devices such as, but not limited to, smartphones, tablets, laptops, smartwatches, and the like, can show damage such as cracks, scuffmarks, or the like. The visible damage can be important in understanding whether the shipping box or container was damaged during shipment, or whether a computer device has lost some of its value. Objects such as computer devices also include numerous components that are assembled together. The assembly process can include fasteners (e.g., screws or the like) that keep the various components secured. It is important that these fasteners be installed correctly (e.g., all screws installed (e.g., no missing screws), proper screws installed, screws properly tightened, or the like) as part of the quality control process.

The embodiments disclosed herein are directed to systems and methods for inspecting an appearance of an object (e.g., a computer device such as, but not limited to, a smartphone, a tablet, a laptop, a smartwatch, a cellphone, or the like). The inspection of the appearance and cosmetic grading of the object can be utilized during, for example, manufacturing of a device, in a retail setting in which computer devices are sold/purchased, or the like.

An image of an object can be captured from each of a plurality of cameras (in a specific cosmetic grading device) or a plurality of images from a single camera can alternatively be captured. "Profile images" (i.e., images of a particular object can be captured in a calibration process and used to train the cosmetic grading system. Each image of an object being validated (i.e., a test object) can be taken in the same coordinate system or with a predetermined relationship. Each of the captured images is compared against the corresponding profile image to determine a cosmetic score.

Figure 1:
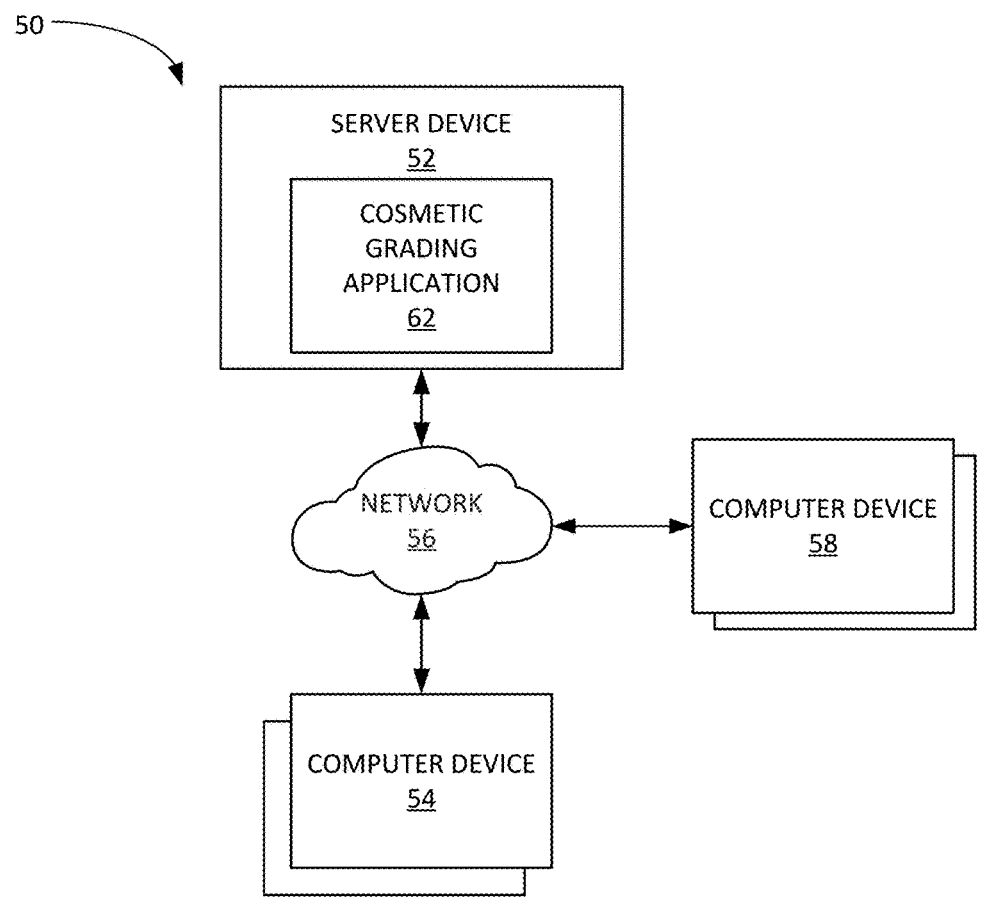
FIG. 1 shows a cosmetic grading system, according to some embodiments.

FIG. 1 shows a cosmetic grading system 50, according to some embodiments. The cosmetic grading system 50 can be used to, for example, provide a variety of different cosmetic grades for various test objects. The cosmetic grading system 50 can provide a cosmetic grade for different types of test objects captured by different types of devices. For example, in some embodiments, the cosmetic grading system 50 can provide a cosmetic grading service that can be accessed by a variety of different remote devices that are able to utilize a server of the cosmetic grading system 50.

The cosmetic grading system 50 generally includes a server device 52 in communication with a computer device 54 through a network 56. The system 50 can also include a computer device 58 connected to the server device 52 through the network 56.

The server device 52 can include a cosmetic grading application 62 that is configured to compare received images of a test object with images of a corresponding profile test object. The cosmetic grading application 62 can be in communication with a database including profile images of various test objects. The profile images can be of different views of the test object. The profile images can be associated with a particular test object according to a machine readable code such as a barcode. In embodiments, the barcode can be a QR code. As a result, when the cosmetic grading application 62 receives an image of a barcode, the barcode can be used to retrieve the appropriate profile images for the test object. The cosmetic grading application 62 can then compare images received from the computer device 54 or 58 and, based on the comparison, grade the cosmetic appearance of the test object. The cosmetic grading application 62 can then store the result and can also output the result via the network 56 to the computer device 54 or the 58. In this manner, the computer device 54 and the computer device 58 can be used to grade a cosmetic appearance of a test object without the computer device 54 or the computer device 58 being specifically configured with a cosmetic grading application.

The network 56 may be referred to as the communications network 56. Examples of the network 56 include, but are not limited to, a local area network (LAN), a wide area network (WAN), the Internet, or the like. The computer device 54 or computer device 58 can transmit data via the network 56 through a wireless connection using Wi-Fi, Bluetooth, or other similar wireless communication protocols. The computer device 54 or computer device 58 can transmit data via the network 56 through a cellular, 3G, 4G, 5G, or other wireless protocol.

The computer device 54 can be a device specifically configured for capturing images of test objects. An example of the computer device 54 is a cosmetic inspection device such as the system 100 described in additional detail in accordance with FIGS. 2-4 below.

The computer device 58 can include an application that permits a user to send images of a test object over the network 56 to the server device 52 for cosmetic grading. The computer device 58 includes a camera and a network input/output to accomplish the communication and image capturing. The computer device 58 includes a display for showing results of the cosmetic grading. In some embodiments, the computer device 58 is a smartphone, a tablet, or the like. The computer device 58 can also be a laptop or a desktop computer having a camera attached thereto.

Figure 2:
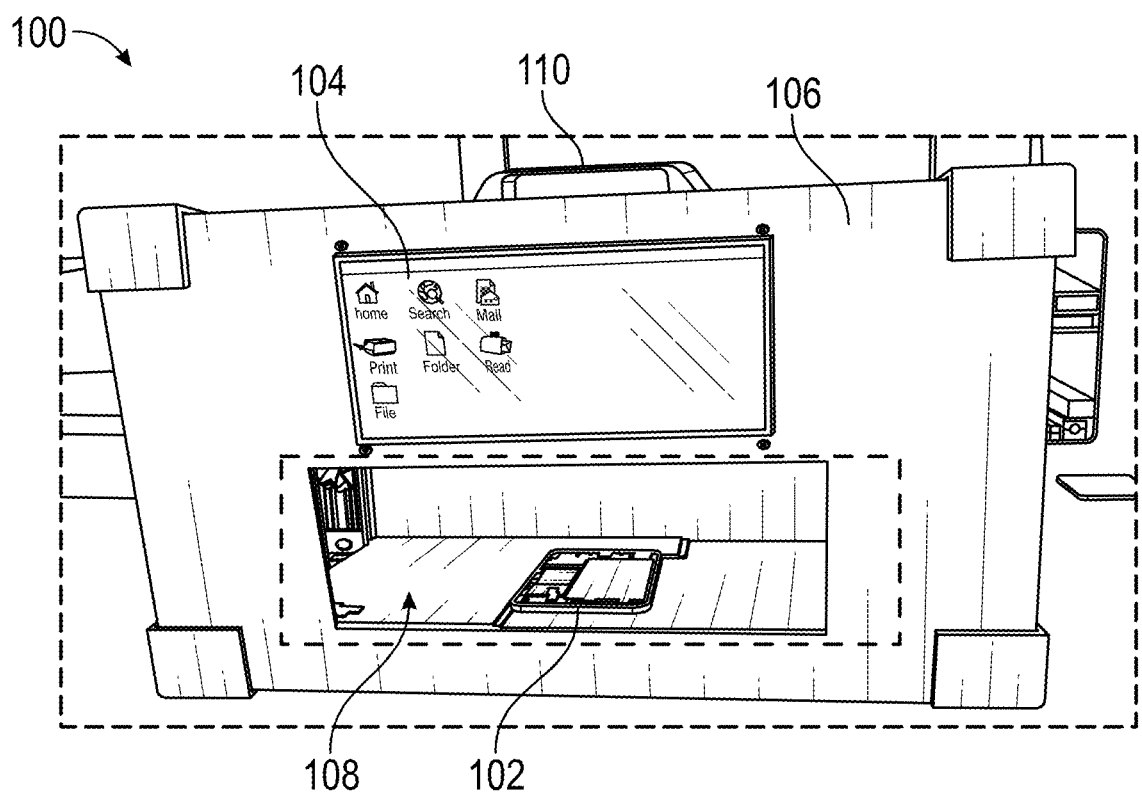
FIG. 2 shows a system for validation of installation of a component in an assembly, according to an embodiment.

FIG. 2 shows a system 100 for grading an appearance of a test object 102, according to some embodiments. The system 100 can generally be used to, for example, capture images of the test object and communicate with a server device having a cosmetic grading application to assess a cosmetic appearance of the test object. For example, in some embodiments, the system 100 can be a kiosk implemented in a retail environment and the test object can be a shipping container, an electronic device (e.g., a smartphone, a smartwatch, a tablet, or the like) and determine whether the cosmetic appearance of the test object is damaged. In some embodiments, the validation can be part of a quality control process during manufacturing.

In the illustrated embodiment, the test object 102 is a smartphone. It is to be appreciated that the smartphone is an example, and the test object 102 can vary beyond a smartphone. Examples of other test objects 102 include, but are not limited to, a tablet, a smartwatch, a mobile phone other than a smartphone, a personal digital assistant (PDA), a laptop computing device, or the like. Furthermore, the maker or manufacturer of the test object 102 is not limited. That is, the system 100 can be used to validate the installation correctness of components in test objects 102 from different manufacturers so long as a calibration procedure is performed to create a profile image for the corresponding test object 102.

The system 100 includes a display 104 for displaying results of the validation to the user. In some embodiments, the display 104 can be a combined display and input (e.g., a touchscreen). In some embodiments, the display 104 can be a display of a tablet or the like. In such an embodiment, a memory of the tablet can store one or more programs to be executed by a processing device of the tablet for validating the correctness of the installation of the component in the test object 102.

In the illustrated embodiment, the display 104 is secured to housing 106 of the system 100. In some embodiments, the display 104 can be separate from the housing 106 (i.e., not secured to the housing 106, but positioned near the system 100 and electronically connected to the system 100). However, it may be beneficial to secure the display 104 to the housing 106 to reduce a footprint of the system 100.

A platform 108 is utilized to position the test object 102 within the system 100 for validation. The platform 108 enables each test object 102 placed into the system 100 for validation to be placed in substantially the same location. As a result, an amount of effort in determining whether the profile image and the test object 102 under test (test object) is in a same location relative to cameras of the system 100 can be reduced. The platform 108 is shown and described in additional detail in accordance with FIG. 3 below.

In some embodiments, the system 100 can be portable. For example, the illustrated embodiment shows system 100 with a handle 110 for carrying the system 100. It is to be appreciated that portability of the system 100 is optional, and accordingly, the handle 110 is optional. In some embodiments, the system 100 may be sized differently based on the type of test object 102 to be validated.

Figure 3:
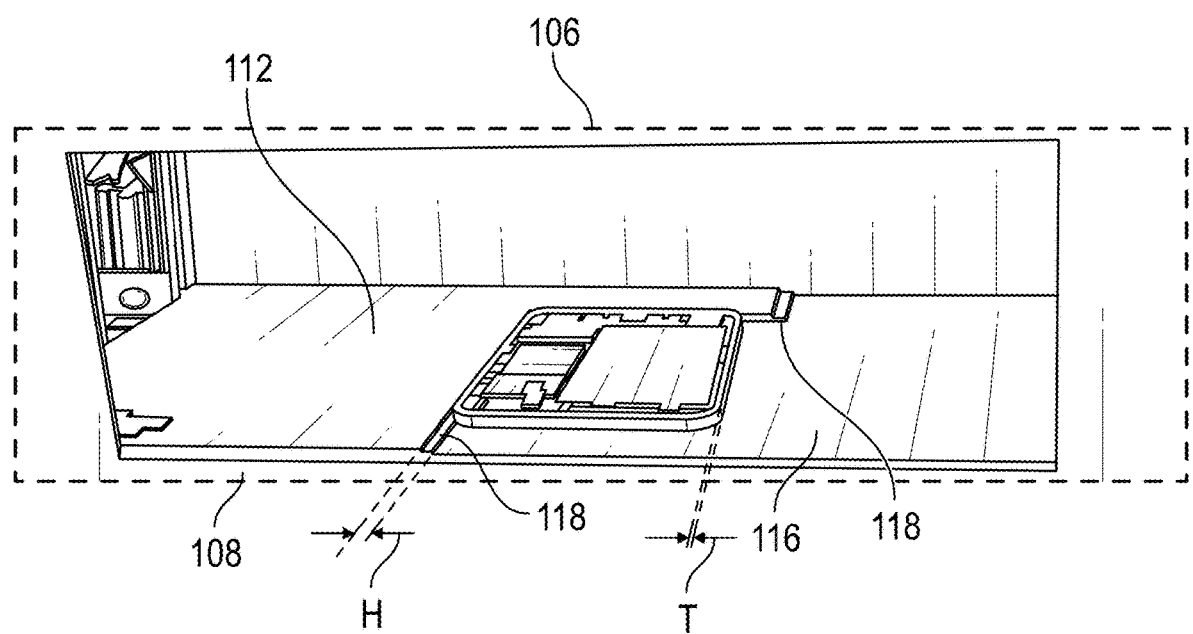
FIG. 3 shows a portion of the system for validation of installation of a component of an assembly of FIG. 2, according to an embodiment.

FIG. 3 shows the platform 108 of the system 100 of FIG. 2 for validation of installation of a component in an test object 102, according to an embodiment.

The platform 108 includes a tiered surface having a first surface 112 and a second surface 116. A step is thus formed between the first surface 112 and the second surface 116. A plane of the first surface 112 and a plane of the second surface 116 are parallel. In the illustrated embodiment, the second surface 116 is L-shaped when viewed from a top view.

The second surface 116 is positioned a height H from the first surface 112. The height H between the first surface 112 and the second surface 116 creates an abutment surface 118.

The height H is selected such that the abutment surface 118 serves as a stop for the test object 102 when placed within the system 100. The abutment surface 118 is configured to provide a stop for the test object 102 on two sides of the test object 102 (i.e., a major dimension of the test object 102 and a minor dimension of the test object 102).

The height H is selected to be smaller than a thickness T of the test object 102 being validated in the system 100. The height H is selected to be smaller than the thickness T of the test object 102 to not hinder side views of the test object 102. The height H is selected to be large enough that an operator inserting the test object 102 can abut the test object 102 with the abutment surface 118. In this manner, the abutment surface 118 serves as a stop for the operator when inserting the test object 102 into the system 100. In some embodiments, the height H can be substantially the same as the thickness T of the test object 102.

The configuration of the platform 108 is helpful in establishing the location of the test object 102. By including the platform 108, the system 100 can be calibrated to generate the profile images using a single assembly since the coordinate system is generally fixed. The platform 108 can, as a result, be used to account for minor variations in placement of the test object 102 by the operator as the offset from the expected coordinated system can be determined based on the location of the test object 102 relative to a calibration test object 102.

Figure 4:
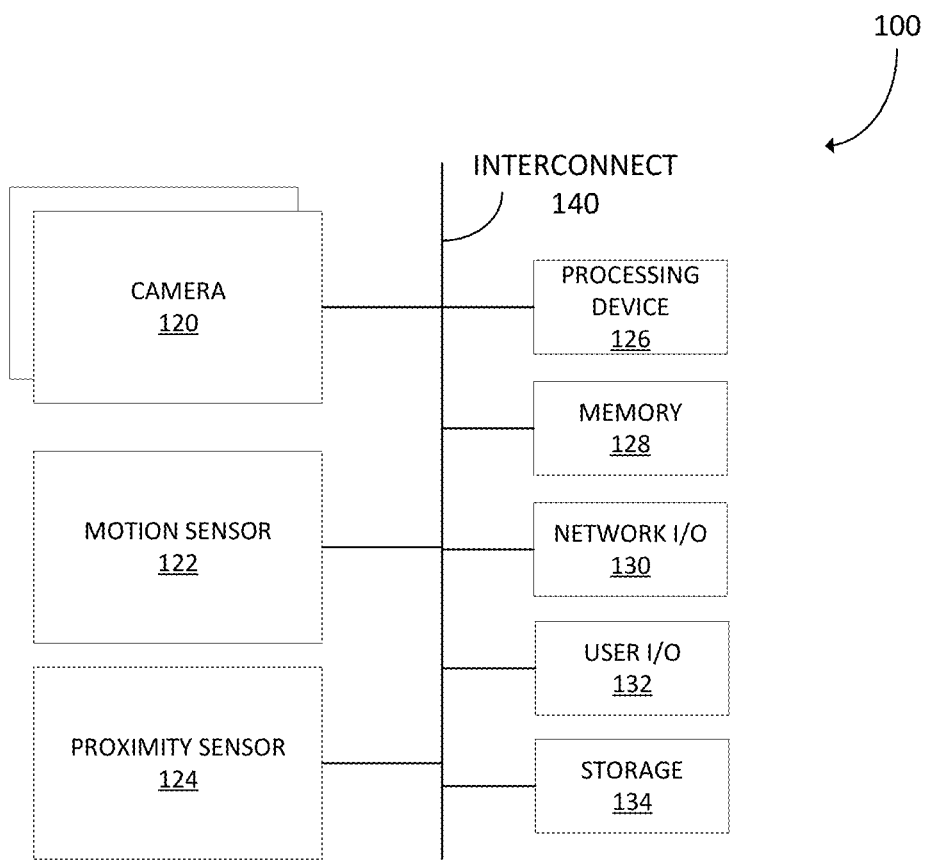
FIG. 4 shows a schematic architecture for the system of FIG. 2, according to an embodiment.

FIG. 4 shows a schematic architecture for the system 100 of FIG. 2, according to an embodiment.

The system 100 generally includes a plurality of cameras 120; a motion sensor 122; a proximity sensor 124; a processing device 126, memory 128, a network input/output (I/O) 130, user I/O 132, storage 134, and an interconnect 136. The processing device 126, memory 128, network input/output (I/O) 130, user I/O 132, storage 134, and interconnect 136 can be within the housing 106 in some embodiments. In some embodiments, the processing device 126, memory 128, network input/output (I/O) 130, user I/O 132, storage 134, and interconnect 136 can be external from the housing 106.

The plurality of cameras 120 are arranged in the system 100 to capture different views of the test object 102. In some embodiments, the cameras 120 are digital cameras. For example, in some embodiments the system 100 includes three cameras 120 arranged to capture a top view, an up-front view, and an up-side view. In some embodiments, the system 100 includes four cameras 120 arranged to capture a top view, an up-front view, a first up-side view, and a second (opposite) up-side view. It will be appreciated that a single camera 120 could be used, although accuracy may be improved when a plurality of cameras 120 are used as a component may appear to be correctly installed in a first view but be determined to be incorrectly installed in a second view.

The motion sensor 122 can be, for example, a laser sensor that can be triggered when an object (i.e., test object 102) breaks the laser signal. The motion sensor 122 can be installed at the opening to the housing 106. In some embodiments, the motion sensor 122 may not be included.

The proximity sensor 124 can be a sensor to determine when an object is placed near it. The proximity sensor 124 can be placed in the platform 108 of the system 100. In some embodiments, when the motion sensor 122 is triggered and the proximity sensor 124 detects an object, the cameras 120 can capture images of the test object 102 on the platform 108. In some embodiments, the proximity sensor 124 can be included regardless of whether the motion sensor 122 is present. In some embodiments with both motion sensor 122 and proximity sensor 124, the image capturing may be performed after the proximity sensor 124 detects the test object 102.

In some embodiments, automatically causing the image capturing and subsequent validation to be performed using the proximity sensor 124, or a combination of the proximity sensor 124 and the motion sensor 122, can increase a number of test objects 102 that can be validated in a set period. That is, reducing effort of a human operator, or even allowing for a robotic arm to load the test object 102 into the system 100 for validation, can reduce an amount of time and effort needed to review the quality of the manufacturing process.

The processing device 126 can retrieve and execute programming instructions stored in the memory 128, the storage 134, or combinations thereof. The processing device 126 can also store and retrieve application data residing in the memory 128.

The interconnect 136 is used to transmit programming instructions and/or application data between the processing device 126, the user I/O 132, the memory 128, the storage 134, and the network I/O 130. The interconnect 136 can, for example, be one or more busses or the like. The processing device 126 can be a single processing device, multiple processing devices, or a single processing device having multiple processing cores. In some embodiments, the processing device 126 can be a single-threaded processing device. In some embodiments, the processing device 126 can be a multi-threaded processing device.

The memory 128 is generally included to be representative of a random-access memory such as, but not limited to, Static Random-Access Memory (SRAM), Dynamic Random-Access Memory (DRAM), or Flash. In some embodiments, the memory 128 can be a volatile memory. In some embodiments, the memory 128 can be a non-volatile memory. In some embodiments, at least a portion of the memory 128 can be virtual memory.

The storage 134 is generally included to be representative of a non-volatile memory such as, but not limited to, a hard disk drive, a solid-state device, removable memory cards, optical storage, flash memory devices, network attached storage (NAS), or connections to storage area network (SAN) devices, or other similar devices that may store non-volatile data. In some embodiments, the storage 134 is a computer readable medium. In some embodiments, the storage 134 can include storage that is external to the user device, such as in a cloud.

Figure 5:
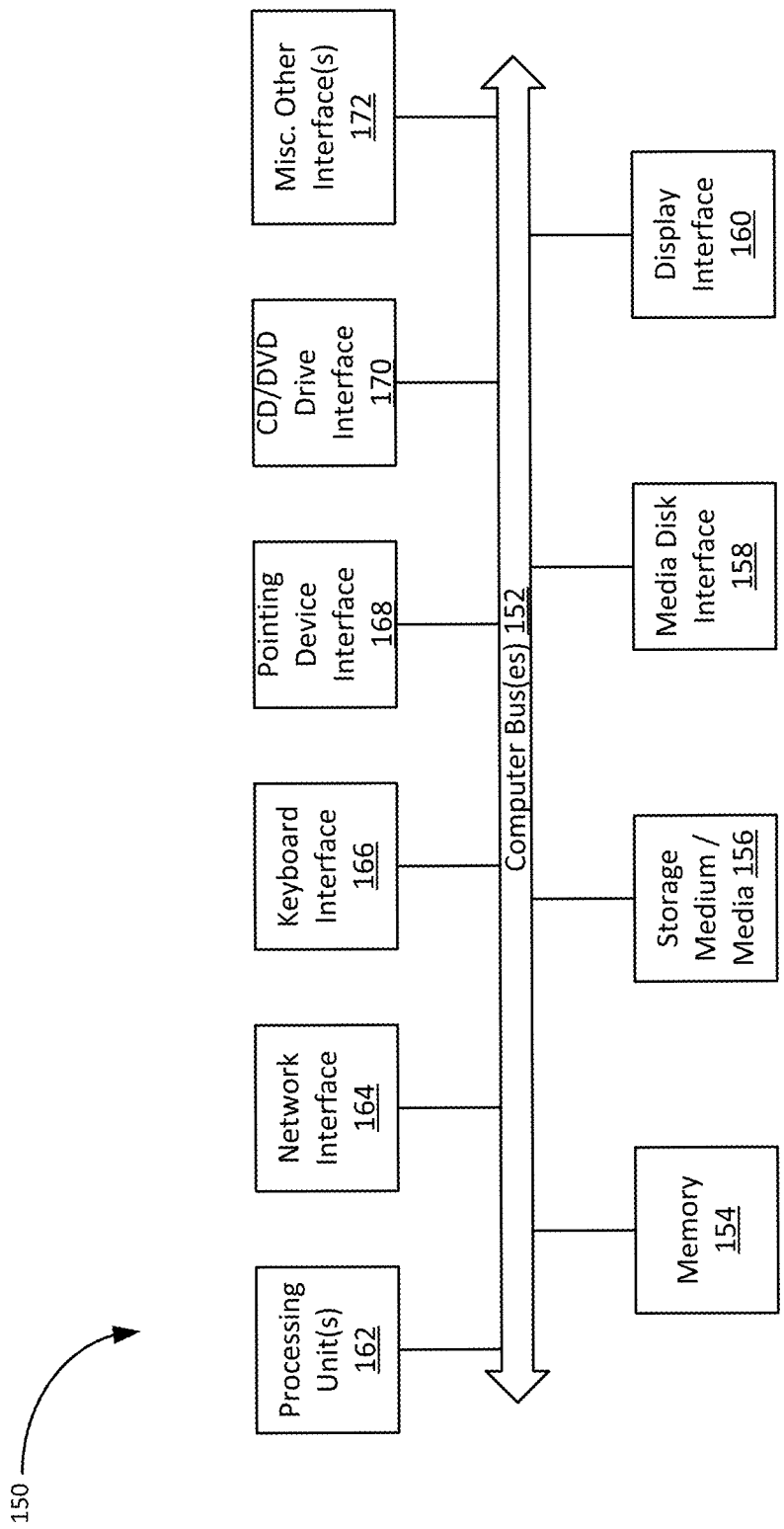
FIG. 5 shows a block diagram illustrating an internal architecture of an example of a mobile device, according to some embodiments.

FIG. 5 shows a block diagram illustrating an internal architecture of an example of a computer, according to some embodiments. In some embodiments, the computer can be, for example, the server device 52, the computer device 54, or the computer device 58, in accordance with some embodiments.

A computer as referred to herein refers to any device with a processor capable of executing logic or coded instructions, and could be a server, personal computer, set top box, smart phone, pad computer or media device, to name a few such devices. As shown in the example of FIG. 5, internal architecture 150 includes one or more processing units (also referred to herein as CPUs) 162, which interface with at least one computer bus 152. Also interfacing with computer bus 152 are persistent storage medium/media 156, network interface 164, memory 154, e.g., random access memory (RAM), run-time transient memory, read only memory (ROM), etc., media disk drive interface 158 as an interface for a drive that can read and/or write to media including removable media such as floppy, CD ROM, DVD, etc. media, display interface 160 as interface for a monitor or other display device, keyboard interface 166 as interface for a keyboard, pointing device interface 168 as an interface for a mouse or other pointing device, and miscellaneous other interfaces 170, 172 not shown individually, such as parallel and serial port interfaces, a universal serial bus (USB) interface, and the like.

Memory 154 interfaces with computer bus 152 so as to provide information stored in memory 154 to CPU 162 during execution of software programs such as an operating system, application programs, device drivers, and software modules that comprise program code, and/or computer executable process operations, incorporating functionality described herein, e.g., one or more of process flows described herein. CPU 162 first loads computer executable process operations from storage, e.g., memory 154, storage medium/media 156, removable media drive, and/or other storage device. CPU 162 can then execute the stored process operations in order to execute the loaded computer-executable process operations. Stored data, e.g., data stored by a storage device, can be accessed by CPU 162 during the execution of computer-executable process operations.

Persistent storage medium/media 156 is a computer readable storage medium(s) that can be used to store software and data, e.g., an operating system and one or more application programs. Persistent storage medium/media 156 can also be used to store device drivers, such as one or more of a digital camera driver, monitor driver, printer driver, scanner driver, or other device drivers, web pages, content files, playlists, and other files. Persistent storage medium/media 156 can further include program modules and data files used to implement one or more embodiments of the present disclosure.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

Figure 6:
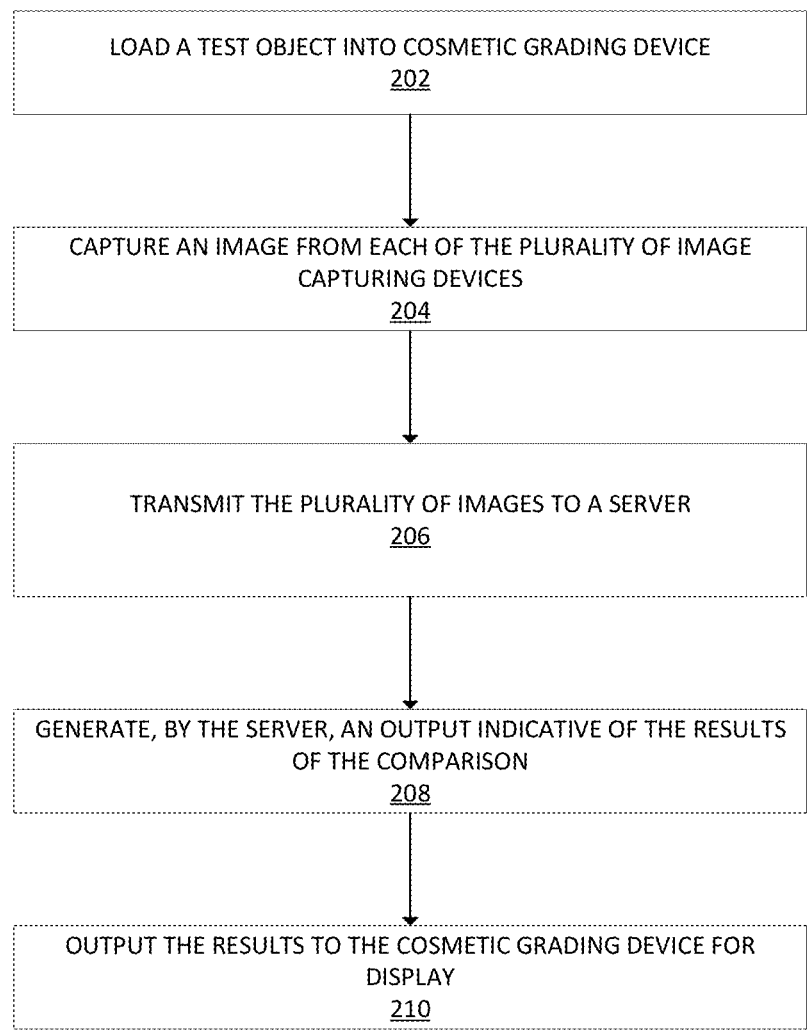
FIG. 6 shows a flowchart of a method, according to some embodiments.

FIG. 6 shows a flowchart of a method 200, according to some embodiments. In some embodiments, the method 200 can be representative of a cosmetic grading service being accessed via a cosmetic grading device. In some embodiments, the cosmetic grading device can be implemented as a kiosk or the like in a setting such as a retail store. In some embodiments, the cosmetic grading device can be utilized in other environments such as, for example, in a manufacturing environment in which the object to be tested is a shipping box to be shipped or a computer device to be refurbished. It is to be appreciated that these are examples, and the applications can vary beyond the above stated examples.

At block 202 a test object is loaded into the system 100. This includes abutting the test object with the abutment surface 118 of the platform 108. In some embodiments, the test object can be loaded by a human operator. In some embodiments, a robotic or mechanical arm can be automated to place the test object onto the platform 108. In some embodiments, the test object can be a computer device such as, but not limited to, a smartphone, smartwatch, tablet, or the like. The placement of the test object can cause the motion sensor 122, the proximity sensor 124, or a combination thereof, to generate a signal indicative of the test object being in place.

At block 204, in response to the signal generated by the motion sensor 122, the proximity sensor 124, or a combination thereof, the plurality of cameras 120 each capture an image. As discussed above, the cameras 120 are oriented such that the captured images are of different views of the test object. In some embodiments, the test object can have a barcode (e.g., a QR code or other machine readable code) on a surface of the test object that is captured by one of the cameras 120.

At block 206, the captured images are transmitted to a server device to be compared against profile images that are retrieved using the barcode as captured.

At block 208 an output is generated by the server device that is indicative of the results of the validation (e.g., pass, fail, needs review). The output can be based on a range of the matching score. That is, if the matching score is greater than a first value, then the output can be that the test object passes; between the first value and a lower second value, the test object may need checking (e.g., by an operator); and between the lower second value and a third value that is lower than the second value, the test object may fail. A failure can mean, for example, that the test object is damaged such that the appearance does not match the expected appearance.

To obtain the grade, the method includes selecting, by the processor, a region of interest in each of the plurality of images of the test object. In some embodiments, the region of interest includes the test object having a background removed. In some embodiments, for the plurality of regions of interest as selected, the method includes comparing, by the processor, each region of interest with a corresponding profile image and identifying defects in each region of interest. In some embodiments, the corresponding profile image is determined from the image barcode on the test object. In some embodiments, the method includes grading, by the processor, a cosmetic appearance of each region of interest based on the identified defects. In some embodiments, the method includes storing the grades of the cosmetic appearance for each region of interest.

At block 210, the output is received by the system 100 and displayed on the display 104 of the system 100.

Figure 7:
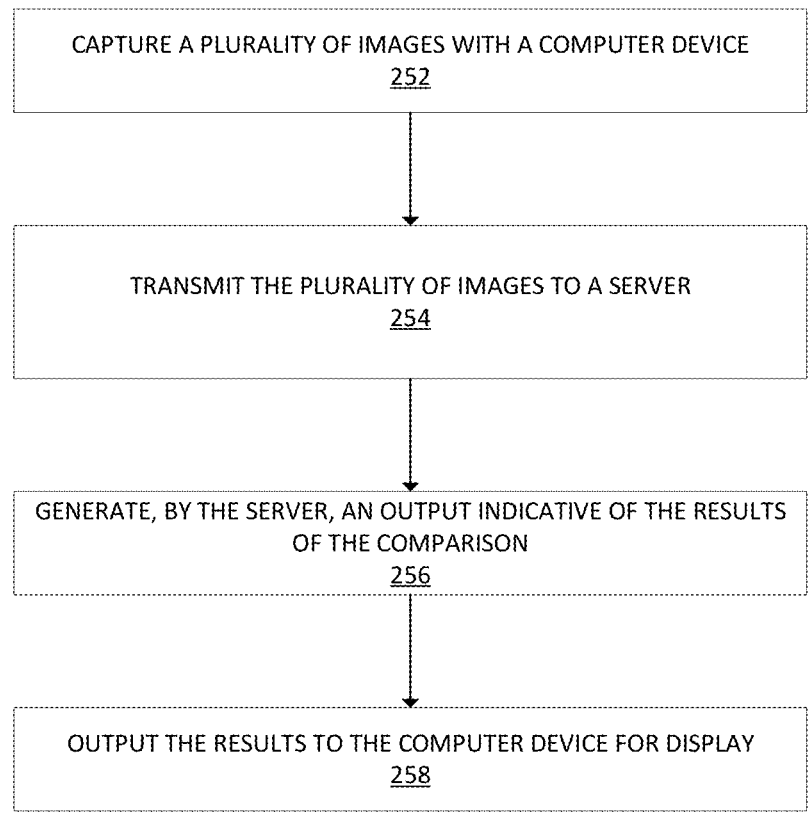
FIG. 7 shows a flowchart of a method, according to some embodiments.

FIG. 7 shows a flowchart of a method 250, according to some embodiments. In some embodiments, the method 250 can be representative of a cosmetic grading service being accessed via a computer device such as a smartphone or the like. In some embodiments, the computer device can be utilized to review aesthetics of test objects in any environment accessible by a user, so long as the server providing the cosmetic grading service has received some profile images of the test object against which the images received from the computer device can be compared.

At block 252 a plurality of images of a test object are captured. The user can orient the computer device to capture multiple views of the test object. In some embodiments, the test object can have a barcode (e.g., a QR code or other machine readable code) on a surface of the test object that is captured by the camera of the computer device.

At block 254, the captured images are transmitted to a server device to be compared against profile images that are retrieved using the barcode as captured.

At block 256 an output is generated by the server device that is indicative of the results of the validation (e.g., pass, fail, needs review). The output can be based on a range of the matching score. That is, if the matching score is greater than a first value, then the output can be that the test object passes; between the first value and a lower second value, the test object may need checking (e.g., by an operator); and between the lower second value and a third value that is lower than the second value, the test object may fail. A failure can mean, for example, that the test object is damaged such that the appearance does not match the expected appearance.

To obtain the grade, the method includes selecting, by the processor, a region of interest in each of the plurality of images of the test object. In some embodiments, the region of interest includes the test object having a background removed. In some embodiments, for the plurality of regions of interest as selected, the method includes comparing, by the processor, each region of interest with a corresponding profile image and identifying defects in each region of interest. In some embodiments, the corresponding profile image is determined from the image barcode on the test object. In some embodiments, the method includes grading, by the processor, a cosmetic appearance of each region of interest based on the identified defects. In some embodiments, the method includes storing the grades of the cosmetic appearance for each region of interest.

At block 258, the output is received by the computer device and displayed on the display of the computer device.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A method, comprising:
 receiving, by a processor, a plurality of images of a test object, the plurality of images including a plurality of surfaces of the test object captured by a smartphone that is not the test object;
 receiving, by the processor, an image of a barcode on the test object, wherein the image of the barcode is displayed on a display of the test object;
wherein the image of the barcode was captured by the smartphone that is not the test object;
selecting, by the processor, a region of interest in each of the plurality of images of the test object, the region of interest comprising the test object having a background removed;
for the plurality of regions of interest as selected, comparing, by the processor, each region of interest with a corresponding profile image and identifying defects in each region of interest,
wherein the corresponding profile image is determined from the image of the barcode on the test object,
grading, by the processor, a cosmetic appearance of each region of interest based on the identified defects;
storing the grades of the cosmetic appearance for each region of interest; and
sending the grades of the cosmetic appearance for each region of interest to the smartphone that is not the test object.

2. The method of claim 1, wherein the smartphone that is not the test object comprises a camera configured to capture the plurality of images.

3. The method of claim 1, wherein the barcode is a QR code.

4. The method of claim 1, comprising aligning the plurality of images with the corresponding profile images.

5. The method of claim 1, wherein the test object is a mobile device; comprising determining a value of the mobile device based on the grades of the cosmetic appearance for each region of interest.

6. The method of claim 1, wherein the test object is a mobile device; wherein the barcode is a QR code displayed on a display of the mobile device.

7. A system, comprising:
a server device comprising a processor and a memory, wherein the processor of the server device is configured to:
receive a plurality of images of a test object, the plurality of images including a plurality of surfaces of the test object captured by a smartphone that is not the test object;
receive an image of a barcode on the test object,
wherein the image of the barcode is displayed on a display of the test object;
wherein the image of the barcode was captured by the smartphone that is not the test object;
select a region of interest in each of the plurality of images of the test object, the region of interest comprising the test object having a background removed; and
for the plurality of regions of interest as selected, the processor is configured to compare each region of interest with a corresponding profile image and identify defects in each region of interest,
wherein the corresponding profile image is determined from the image of the barcode on the test object,
grade, by the processor, a cosmetic appearance of each region of interest based on the identified defects;
store the grades of the cosmetic appearance for each region of interest; and
send the grades of the cosmetic appearance for each region of interest to the smartphone that is not the test object.

8. The system of claim 7, wherein the smartphone that is not the test object comprises a camera configured to capture the plurality of images.

9. The system of claim 7, wherein the barcode is a QR code.

10. The system of claim 7, wherein the processor is configured to align the plurality of images with the corresponding profile images.

11. The system of claim 7, wherein the test object is a mobile device; wherein the processor is configured to determine a value of the mobile device based on the grades of the cosmetic appearance for each region of interest.

12. The system of claim 7, wherein the test object is a mobile device; wherein the barcode is a QR code displayed on a display of the mobile device.

13. A non-transitory computer-readable storage medium comprising instructions that, when executed by a processor, cause the processor to perform a method, comprising:
receiving, by a processor, a plurality of images of a test object, the plurality of images including a plurality of surfaces of the test object captured by a smartphone that is not the test object;
receiving, by the processor, an image of a barcode on the test object,
wherein the image of the barcode is displayed on a display of the test object;
wherein the image of the barcode was captured by the smartphone that is not the test object;
selecting, by the processor, a region of interest in each of the plurality of images of the test object, the region of interest comprising the test object having a background removed;
for the plurality of regions of interest as selected, comparing, by the processor, each region of interest with a corresponding profile image and identifying defects in each region of interest,
wherein the corresponding profile image is determined from the image of the barcode on the test object,
grading, by the processor, a cosmetic appearance of each region of interest based on the identified defects;
storing the grades of the cosmetic appearance for each region of interest; and
sending the grades of the cosmetic appearance for each region of interest to the smartphone that is not the test object.

* * * * *